(12) United States Patent
Boogh

(10) Patent No.: US 6,915,052 B2
(45) Date of Patent: Jul. 5, 2005

(54) COVERED OPTICAL FIBER

(75) Inventor: Sonia Japon Boogh, Nyon (CH)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/788,986

(22) Filed: Feb. 27, 2004

(65) Prior Publication Data
US 2005/0031277 A1 Feb. 10, 2005

Related U.S. Application Data

(60) Provisional application No. 60/452,334, filed on Mar. 6, 2003.

(51) Int. Cl.$^7$ .................................................. G02B 6/44
(52) U.S. Cl. ...................... 385/112; 385/100; 385/102; 385/103; 385/106; 385/109; 385/113
(58) Field of Search .................................. 385/100–113

(56) References Cited

U.S. PATENT DOCUMENTS

| 6,483,971 | B2 | 11/2002 | Gaillard et al. |
| 6,760,528 | B2 * | 7/2004 | Simomichi et al. ......... 385/128 |
| 2002/0001440 | A1 | 1/2002 | Bourget |
| 2003/0044139 | A1 * | 3/2003 | Norris et al. ............... 385/113 |

* cited by examiner

Primary Examiner—Frank G. Font
Assistant Examiner—Derek L. Dupuis

(57) ABSTRACT

Covered optical fibers are provided comprising at least on optical fiber; and a buffer tube covering surrounding the optical fiber. The buffer tube covering is comprised of a blend of at least 40% by weight of a copolyether ester elastomer, at least 10% by weight of a rubbery modifier, and at least 10% by weight of an amorphous thermoplastic polymer, and has a melting point of at least 165° C. and a Trouser Tear Strength of less than 65 N/mm.

11 Claims, 1 Drawing Sheet

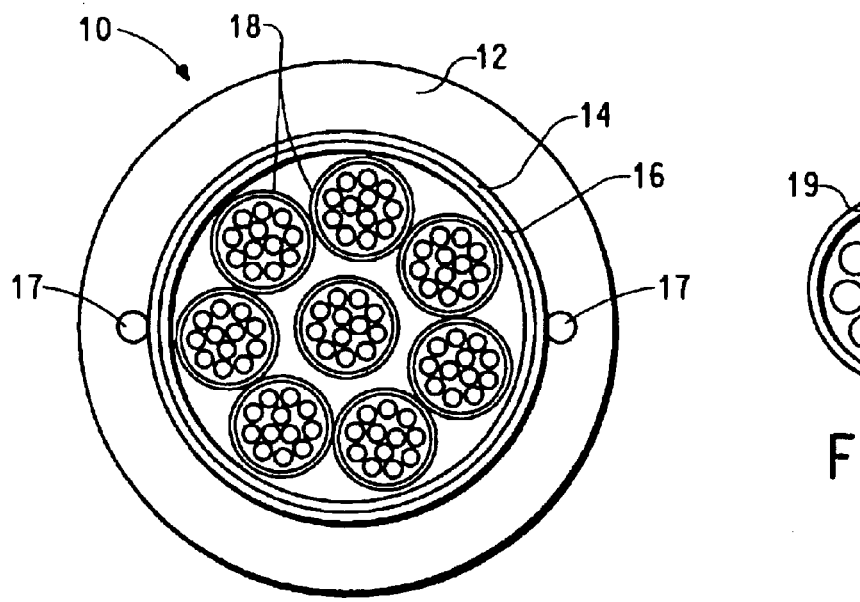
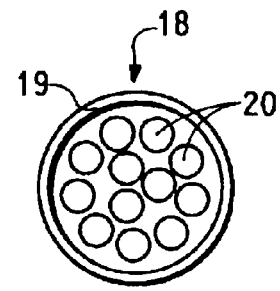
FIG. 1
FIG. 2
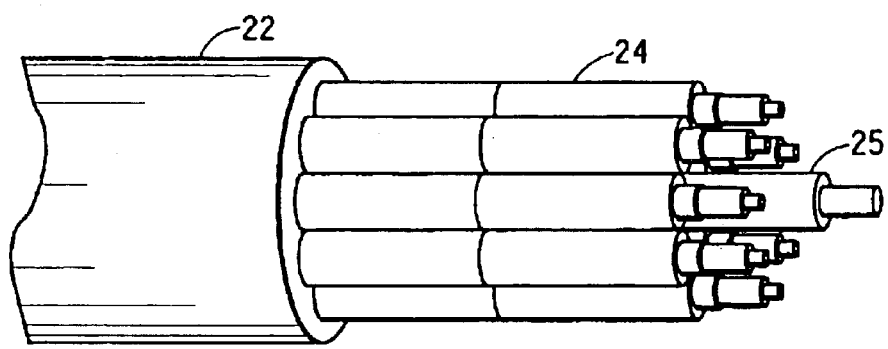
FIG. 3
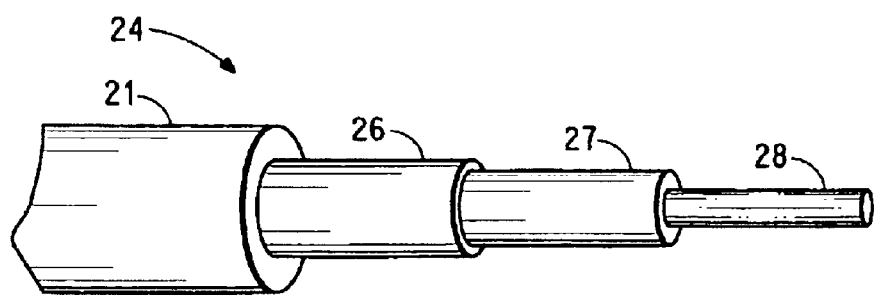
FIG. 4

COVERED OPTICAL FIBER

CROSS REFERENCE TO RELATED APPLICATION

This application claims the benefit of U.S. Provisional Application No. 60/452,334 filed Mar. 6, 2003.

BACKGROUND

1. Field of the Invention

The present invention relates to telecommunications cables. More particularly, the invention relates to cables containing optical fibers disposed in strippable tubular coverings or buffer tubes made of thermoplastic elastomer.

2. Description of the Related Art

Optical fiber cables generally include an outer thermoplastic sheath, which may include metal or dielectric protective reinforcing elements, that surrounds reinforcing or protective layers, that in turn surround a plurality of optical glass fiber constructions. The optical glass fiber constructions are generally of either a "loose-tube" construction or a "tight buffer" construction.

A cross-sectional view of an optical fiber cable with a loose tube construction is shown FIG. 1. Cable 10 has an outer jacket 12 that may incorporate one or more strength members 17. The jacket 12 is generally comprised of a protective polymer such as polyethylene or polyvinyl chloride. The strength members 17 are generally steel or high strength synthetic cables. The jacket 12 surrounds one or more layers 14 and 16 of reinforcing or protective materials. The layers 14 and/or 16 surround a plurality of optical fiber bundles 18. Reinforcing materials in the layers 14 and/or 16 may be formed as a flexible metal sheath and/or a high strength synthetic fiber sheath such as a covering comprised of Kevlar® aramid yarn. One protective material used in the layers 14 and/or 16 can be a layer of a super absorbent polymer. As best shown in FIG. 2, each optical fiber bundle 18 is comprised of anywhere from two to twenty-five optical fibers 20 that are encased within a buffer tube 19. Each buffer tube 19 provides both mechanical and chemical protection for the optical fibers, and the buffer tubes 19 may be color coded for identification purposes.

A perspective cut-away view of a cable having optical fibers in a tight buffer construction is shown in FIG. 3. An outer jacket 22 is provided that may incorporate strength members. The outer jacket 22 surrounds a plurality of individual sheathed fibers 24 that in turn surround a central strength member 25. The jacket 22 is generally comprised of the same type of polyethylene or polyvinyl chloride polymers found in the outer cable jacket 12 of the cable of FIG. 1. The central strength member 25 is typically a cable of steel or another high strength reinforcing material. As best shown in FIG. 4, each of the individual sheathed fibers 24 are comprised of an optical fiber 28 surrounded by an extruded polymeric buffer tube 27, that is surrounded by a reinforcing sheath 26, that is in turn surrounded by an outer individual fiber sheath 21. The optical glass fibers are frequently treated with acrylics or silicon to reduce the sensitivity of the glass fibers to surface damage. The tight buffer tube 27 is generally comprised of a thermoplastic elastomer, polyvinyl chloride, polyethylene or polypropylene. The reinforcing sheath 26 is generally comprised of a high strength synthetic fiber covering such as a covering comprised of Kevlar® aramid yarn. The outer individual fiber sheath 21 both protects and color codes the optical fibers, and it is often made of polyvinyl chloride.

The buffer tubes of both the loose tube and tight buffer constructions are generally made of a strong, yet flexible material that at the same time is strippable so as to enable the optical glass fibers to be accessed with the fingers or simple tools. At the same time, the buffer tubes must not readily melt during the cable manufacturing process or the optical fiber bundles will stick together making it difficult to select a desired fiber bundle. This is a concern because the outer sheath or other protective layers may be formed by extruding polyethylene or polypropylene around the fiber bundles at molten polymer temperatures that can locally be as high as 150° or 160° C. In addition, it is desirable that the buffer tubes be hard and stiff enough so that the tubes can be readily handled during the cable manufacturing process, as for example when a fibrous reinforcing sheath is wrapped around the buffer tube of a cable having a tight buffer construction. Finally, it is also preferred that the buffer tube in a tight buffer construction not be subject to shrinkage during the cable manufacturing process as such shrinkage results in attenuation of the optical signal being carried by the optical fiber.

U.S. Patent Application Publication No. US 2002/0001440 and U.S. Pat. No. 6,483,971 disclose optical fiber cables made with optical fiber bundles or modules having an extruded skin of a thermoplastic material having flexible diol segments. One of the thermoplastic materials disclosed for the extruded tubes of the modules is Hytrel® thermoplastic elastomer sold by E.I. du Pont de Nemours and Company, Wilmington, Del., USA ("DuPont"). U.S. Patent Application Publication No. US 2002/0001440 specifically references Hytrel® grade G3548L (with an initial resistance to tearing of 60 kN/m, a melting point of 156° C., and a Shore D hardness of 35) and an even softer Hytrel® grade HTR 8 351 NC-010 (with an initial resistance to tearing of just 20 kN/m, a tube melting point of just 140° C., and a Shore D hardness of 23). However, with melting points below 160° C., melting of the buffer tubes is likely to occur during the cable manufacturing process. Further the sub 40 Shore D hardness of these elastomers makes them too soft for efficient handling during the manufacturing process for certain type of cables.

There is a need for a buffer tube for optical fibers that is very easily strippable from the encased optical fibers, but that will not be subject to melting or sticking to other buffer tubes during the cable manufacturing process. There is a further need for a buffer tube comprised of a thermoplastic copolyether ester elastomer that is easily strippable, but that is significantly harder and stiffer than the buffer tube compositions disclosed in the prior art. Unfortunately, when thermoplastics are modified to achieve a higher melting temperature or to obtain increased hardness or stiffness, the material tends to become more shrinkage prone and more difficult to tear.

BRIEF DESCRIPTION OF THE DRAWINGS

FIG. 1 is a cross-sectional view of an optical fiber cable having a loose-tube construction FIG. 2 a cross sectional view of one of the optical fiber bundles of the cable of FIG. 1.

FIG. 3 is a perspective cut-away view of an optical fiber cable having a tight buffer construction FIG. 4 a perspective cut-away view of one of the sheathed optical fibers of FIG. 3.

TEST METHODS

In the description and the examples that follow, the following test methods were employed to determine various reported characteristics and properties. ISO refers to the International Organization for Standardization.

Resistance to tearing was measured according to the Trouser Tear Strength Test (ISO standard 34A) and is reported in units of N/mm. According to the Trouser Tear Strength Test, the leg sections of a trouser-shaped test sample are pulled apart. This test measures the force required to propagate a tear and is designed to measure the fundamental tear properties of a material while being less sensitive to modulus effects than in the case of other tearing tests.

Hardness was measured according to the Shore D hardness scale (ISO standard 868) at 1 second after application of the indenting force, and is reported without units.

Stiffness is characterized in terms of E Modulus (or Young's Modulus) which was measured according to ISO standard 527/2, and is reported in units of MPa.

Strain at break was measured according to ISO standard 527/2 and is reported as a percent.

Tensile strength was measured according to ISO standard 527/2 and is reported in units of MPa.

Shrinkage was measured in the direction parallel to the flow of resin into the mold cavity, according to ISO standard 294-4, and is reported as a percent.

Melt flow index was measured according to ISO standard 1133 at 240° C. using a 2.16 kg weight, and is reported in units of g/10 min.

DETAILED DESCRIPTION

In the optical telecommunications cable shown in FIG. 1, eight optical fiber bundles are housed within the cable 10 in a loose tube construction. As shown in FIG. 2, each optical fiber bundle is encased within a buffer tube 19 that is extruded from a thermoplastic elastomer. In another type of optical telecommunications cable shown in FIGS. 3 and 4, individual sheathed fibers 24 surround a central strength member 25 and are encased within an outer sheath 22. As shown in FIG. 4, the individual sheathed fibers 24 comprise individual optical fibers 28 encased within an extruded thermoplastic buffer tube 27, which is surrounded by a high strength fibrous sheath 26, which in turn is encased within a strong, flexible outer sheath 21.

The optical fiber buffer tubes of the invention are preferably thin, strong and flexible. The thickness of the buffer tubes 19 of the loose tube fiber bundles 18 of FIG. 1 is preferably in the range 0.05 to 0.25 mm, and is more preferably about 0.15 mm. A thin wall thickness is desirable insofar as it facilitates access to the optical fibers 20 and makes it possible to reduce the overall weight of the cable. The thin wall thickness of the buffer tubes means that the buffer tube material must be strong, flexible, and melt resistant. The thickness of the buffer tubes 27 of the tight buffer construction of FIGS. 3 and 4 is preferably in the range 0.15 mm to 0.5 mm, and is more preferably about 0.3 mm.

According to the invention, an optical cable includes optical fiber bundles in which one or more glass optical fibers are encased within an extruded buffer tube. Each buffer tube is comprised of a blend of a relatively hard thermoplastic copolyether ester elastomer, a rubbery modifier, and an amorphous polymer resin. The addition of the rubbery modifier has been found to make the overall composition more tearable without causing a significant reduction in the hardness, the stiffness or the melting temperature of the composition. The addition of the amorphous polymer has been found to increase the stiffness of the composition without making the buffer tube significantly less strippable. By combining a relatively hard thermoplastic copolyether ester elastomer with a rubbery modifier and an amorphous resin, it has been possible to produce optical fiber buffer tubes with a low resistance to tearing of less than 65 N/mm according to the Trouser Tear Strength Test, which buffer tubes surprisingly do not have a correspondingly decreased melting point, hardness or stiffness. Significantly, forming the buffer tubes from a blend of a copolyether ester elastomer, a rubbery modifier and an amorphous thermoplastic resin results in buffer tubes having good stiffness with an E Modulus of more than 200 MPa, and a Shore D Hardness greater than 55. It has further been found that the presence of an amorphous polymer in the formulation surprisingly has the benefit of reducing shrinkage of buffer tubes comprised of the preferred resin formulation. This reduced shrinkage helps to decrease attenuation of the optical signal passing through the cable. At the same time, these buffer tubes are capable of withstanding temperatures of at least 165° C., and more preferably greater than 180° C., and thus prevents the protective buffer tube covering from melting or sticking during the cable manufacturing process.

According to the invention, the buffer tubes around the optical fibers are comprised of a blend of at least 40% by weight of a copolyether ester elastomer, at least 10% by weight of an amorphous thermoplastic polymer, and at least 10% by weight of a rubbery modifier. More preferably, the optical fiber buffer tubes are comprised of 40% to 80% by weight of a copolyether ester elastomer, 10% to 40% by weight of amorphous thermoplastic polymer, and 10% to 40% by weight of a rubbery modifier. Most preferably, the optical fiber buffer tubes are comprised of 50% to 75% by weight of a copolyether ester elastomer, 15% to 30% by weight of amorphous polycarbonate polymer, and 10% to 30% by weight of a rubbery core-shell modifier. The preferred buffer tubes of the invention have a Shore D hardness of at least 55, an E Modulus of at least 200 MPa, and a Trouser Tear Strength of no more than 65 N/mm. Even more preferred buffer tubes of the invention have a Shore D hardness of at least 60, an E Modulus of at least 300 MPa, and a Trouser Tear Strength of no more than 55 N/mm. According to a further preferred embodiment of the invention, the buffer tubes are comprised of a polymer resin blend that has a shrinkage of less than 1%.

The copolyetheresters used in the buffer tubes of the invention are thermoplastic elastomer copolymers. They are linear polymers made up of polyester sequences, produced by reacting dicarboxylic derivatives (terephthalate, isophthalate, etc.) with diols (ethyleneglycol, 1,4-butanediol, cyclohexanedimethanol, etc.) and also polyether sequences (polytetramethylene-etherglycol, polyoxypropyleneglycol, polyethyleneglycol). Suitable copolyetheresters have a multiplicity of recurring long-chain ester units and short-chain ester units joined head-to-tail through ester linkages. The long-chain ester units are represented by the formula:

(I)

and the short-chain ester units are represented by the formula:

(II)

wherein:
G is a divalent radical remaining after the removal of terminal hydroxyl groups from a poly(alkylene oxide) glycol having a number average molecular weight of about 400–4000;
R is a divalent radical remaining after removal of carboxyl groups from a dicarboxylic acid having a molecular weight less than 300;
D is a divalent radical remaining after removal of hydroxyl groups from a diol having a molecular weight less than about 250;
wherein the copolyetherester contains about 25–80 weight percent short-chain ester units.

The elastomer properties are provided by the flexible segments in the polymer chain (copolymers with polyether segments). Low-mass diols lead to hard segments in the linear copolyester chain. The properties of this material depend on the value of the ratio between the hard segments and the soft segments, on the way they are arranged, and on the stage of crystallization. Hard segments contribute to the strength and the stiffness of the final copolymer while flexible segments provide flexibility. These copolymers are generally prepared in two stages: transesterification; and polycondensation.

The preferred copolyether ester elastomer has a Shore D hardness of at least 50 and a melting point of greater than 160° C. An example of a commercial copolyether ester elastomer is DuPont's Hytrel® thermoplastic elastomer, which comprises block copolymers constituted by hard (crystalline) segments of polybutylene terephthalate, and soft (amorphous) segments of long glycol chains. A preferred copolyether ester elastomer is Hytrel® grade G5544 sold by DuPont, which has a melting point of 215° C., a vicat softening temperature of 196° C., a Shore D hardness of 55, and a water absorption of 1.5%.

The rubbery modifier of the composition used to make the buffer tubes of the invention is preferably a cross-linked or vulcanized polymer such as an acrylate copolymer or terpolymer, an acrylic core-shell polymer such as those based on n-butyl acrylate rubber, a nitrile-butyl-diene acrylonitrile resin ("NBR"), ethylene propylene copolymer rubber, or an MBS core-shell modifier which is a graft copolymer of methyl methacrylate, butadiene rubber and styrene. Preferably, the rubbery modifier has a rubber content of at least 50 weight percent, and more preferably of at least 75 weight percent. It is further preferred that the rubbery modifier has a particle size when distributed within the overall composition of less than 1 micron. One preferred rubbery modifier is an acrylate terpolymer sold under the tradename Sunigum P95 by Eliokem.

A more preferred rubbery modifier is a core-shell impact modifier having a rubbery core onto which a thermoplastic shell is grafted wherein the core makes up 70 to 90 percent by weight of the modifier. Preferably, the core is acrylate-based (e.g. alkyl acrylate, polybutyl acrylate-co-styrene) or butadiene-based. The shell is preferably a methyl methacrylate, a polyalkyl methacrylate or a styrene acrylonitrile copolymer. The shell can be funtionalized to improve the compatibilization with other polymers in the overall composition blend so as to provide for a good dispersion of the core-shell impact modifier within the blend. A preferred core-shell impact modifier has a rubbery butyl-acrylate core and a glassy methy methacrylate shell. Such a core-shell impact modifier is sold under the tradename Paraloid EXL2300 by Rhom & Haas.

The amorphous thermoplastic polymer of the composition used to make the buffer tubes of the invention is preferably an amorphous polymer resin such as a polycarbonate, an amorphous polyester copolymer, poly(methyl methacrylate) ("PMMA"), polystyrene, styrene-acrylonitrile copolymer ("SAN"), or acrylonitrile-butadiene-styrene copolymer ("ABS"). In amorphous polymers, the molecular chains do not crystallize, even upon annealing. Amorphous polymers are characterized by their glass transition temperature, Tg, which is the temperature at which the polymers transform from a glassy state to a rubbery state. Most amorphous polymers are transparent.

PMMA is a hard, transparent amorphous polymer belonging to the family of acrylic polymers that has a typical E Modulus of about 2400 MPa and a glass transition temperature of about 104° C. PMMA has the following repeating formula:

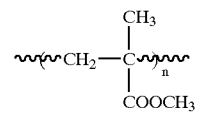

Polystyrene is an amorphous polymer belonging to the family of styrenic polymers, and having a typical E Modulus of about 3000 MPa and a typical glass transition temperature in the range 90–100° C. Polystyrenes include copolymers containing styrenic or acrylic based structures such as SAN and ABS. Notably, ABS is not transparent but has kept its amorphous state. Polystyrenes have the following general repeating formula:

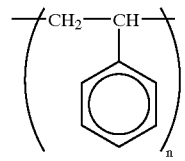

Amorphous thermoplastic copolyesters include amorphous polyethylene terephthalate (PET) and amorphous polybutylene terephthalate (PBT). The amorphous state is usually obtained by copolymerisation. Cyclohexane dimethanol (CHDM) is typically used in PET polymerization to form an amorphous copolyester.

The preferred amorphous polymer of the composition used to make the buffer tubes of the invention is polycarbonate, a high performance polymer that is usually in an amorphous state. Preferred polycarbonates are high molecular weight thermoplastic, aromatic polymers which include homopolycarbonates, copolycarbonates and copolyestercarbonates and mixtures thereof which have average molecular weights of about 8,000 to more than 200,000. Polycarbonate is sensitive to moisture, and therefore a maximum moisture content before processing of 0.02% is desired. A preferred polycarbonate is a bisphenol A ("BPA")

polycarbonate having a Tg of 140° C., an E Modulus of about 2300 MPa, and the following repeating formula:

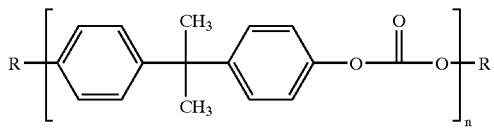

The blend of thermoplastic elastomer, rubbery modifier and amorphous polymer resin used to form the optical fiber coverings of the invention can be modified by adding fillers such as carbon black, silica, kaolin, alumina, clay, wollastonite, talc, chalk, calcium carbonate, titanium dioxide, or colored pigments. These fillers can be surface treated by means of silanes, polyethyleneglycols, or any other coupling molecule. For example, one preferred filler, sold under the name Aktisil EM by Hoffmann Mineral, is a mineral silica produced by modifying the surface of Neuburg Siliceous Earth with selected silanes. The fillers may serve to modify the properties of the resulting buffer tube. In particular, it is possible to use conventional mineral fillers to modify the mechanical deformation properties of the composition.

In addition, the compositions can be softened by fillers of plasticizer type such as mineral oils derived from petroleum, esters of phthalic acid, or sebacic acid, liquid polymer plasticizers such as polybutadiene of low molecular weight, possibly carboxylated, and other plasticizers that are well known to the person skilled in the art. The compositions can also be made more resistant to fire by adding fire retarding agents or they can be made resistant to ultraviolet degradation by the addition of UV stabilizers. The content of such fillers, plasticizers, etc. in the thermoplastic elastomer blend can vary over wide ranges.

The compositions for the buffer tube coverings of the present invention may be prepared by melt blending the copolyether ester, the amorphous thermoplastic polymer and the rubbery modifier. The composition may be formed by admixing the components in the desired proportions and melt blending the admixture under high shear in conventional mixing equipment, such as an extruder, Banbury mill, Buss Kneader, Farrell Continuous Mixer or the like. The components are preferably combined with one another via simultaneous metering of the component streams. When producing covered optical fibers, the above compositions are generally extruded over optical glass fibers at high speed using a single screw extruder with a tubular die as known in the art. Vacuum may be used in the crosshead cavity surrounding the fiber in order to obtain a tight and uniform buffer.

The optical fiber buffer tube covering of the invention is comprised of a blend of a copolyether ester, a rubbery modifier and an amorphous thermoplastic polymer resin. This composition preferably has a Shore D hardness of at least 55, an E Modulus of at least 200 MPa, and a Trouser Tear Strength of no more than 65 N/mm. Even more preferred buffer tubes of the invention have a Shore D hardness of at least 60, an E Modulus of at least 300 MPa, and a Trouser Tear Strength of no more than 55 N/mm. According to a further preferred embodiment of the invention, the buffer tubes are comprised of a polymer composition that has a shrinkage of less than 1%. Preferably, this thermoplastic, at the same time, has a strain at break in the range of 50% to 400%, and preferably in the range of 100% to 200%, and a tensile strength in the range 5 MPa to 30 MPa.

The protective optical fiber buffer tube covering of thermoplastic elastomer preferably has a melt flow index of no more than 10 g/10 min. Such a material can be extruded over optical fibers at high speed without the formation of defects in the optical fiber buffer tube covering. With the preferred compositions, it is possible to achieve application speeds greater than 100 meters per minute, and even greater than 200 m/min.

EXAMPLES

The invention is further illustrated by the following example compositions. It will be appreciated that the examples are for illustrative purposes only and are not intended to limit the invention as described above. Modification of detail may be made without departing from the scope of the invention.

Composition Components

The individual components in the compositions described in the examples below were as follows:

Hytrel® G5544 is a copolyether ester thermoplastic elastomer sold by DuPont, which has a melting point of 215° C., a vicat softening temperature of 196° C., a Shore D hardness of 55, and a water absorption of 1.5%.

Polycarbonate is bisphenol A ("BPA") polycarbonate having a Tg of 140° C., an E Modulus of 2350 MPa, and sold under the name Lexan 121R111 by GE Plastics.

Core-Shell is a core-shell impact modifier having a rubbery butyl-acrylate core onto which a glassy thermoplastic methyl methacrylate shell is grafted wherein the core makes up 70 to 90 percent by weight of the modifier, and which is sold under the name Paraloid EXL2300 by Rhom & Haas Rubber is a vulcanized acrylate terpolymer partitioned with calcium carbonate having a Shore A hardness of 53, which is sold under the name Sunigum P95 by Eliokem.

Clay is a surface-treated calcinated clay having a mean particle size of 2 microns, and sold under the name Polarite 102A by Imerys.

Wollastonite is a calcium meta silicate particulate mineral having a mean particle size of 3 microns, which is sold under the name Wollastocoat M3 by Nyco Minerals.

Silitin is an epoxy-silane coated silitin containing 25% kaolinite (China Clay) and 68% quartz having a mean particle size of 2.4 microns, which is sold under the name Aktisil EM by Hoffmann Mineral.

Minor Additives are phoshpite antioxidant (Weston 619 F sold by GE Specialty Chemicals) and lubricants (wax or silicone additives).

The compositions of the examples were made by compounding the components using a laboratory scale twin screw extruder, wherein the temperature of the melt was 260° C., the screw speed was 250 rpm and the average volumetric flow rate was 80 kg/hr. The compositions and their properties are set forth below in Table 1.

TABLE 1

| | Comp. 1 | 2a | 2b | 2c | 3a | 3b | 4a | 4b | 5a | 5b | 5c |
|---|---|---|---|---|---|---|---|---|---|---|---|
| Composition (wt. Percent) | | | | | | | | | | | |
| Hytrel ® G5544 | 100 | 45 | 49.55 | 59.05 | 45 | 45 | 85 | 65 | 55 | 55 | 55 |
| Polycarbonate | | 20 | 25 | 25 | 20 | 20 | | 20 | 20 | 20 | 20 |
| Core-Shell Rubber | | 30 | 15 | 15 | 30 | | 15 | 15 | 15 | 15 | 15 |
| Clay | | | | | | 30 | | | | | |
| Wollastonite | | 5 | 10 | | 5 | 5 | | | 10 | | |
| Siltin | | | | | | | | | | 10 | |
| Minor additives | | | 0.45 | 0.95 | | | | | | | 10 |
| Properties | | | | | | | | | | | |
| Melt Flow Index (g/10 min.) | | | 9 | 9 | | | | | | | |
| Melting temperature (° C.) | 215 | | 207 | 208 | | | | | | | |
| Trouser Tear Strength (N/mm) | 60 | 32 | 43 | 61 | 32 | 33 | 43 | 53 | 37 | 40 | 39 |
| E Modulus (MPa) | 145 | 440 | 740 | 290 | 440 | 210 | 140 | 310 | 470 | 420 | 420 |
| Shore D Hardness - 1 sec. | 54 | 60 | 67 | 62 | 60 | 58 | 51 | 60 | 64 | 64 | 63 |
| Tensile - stress at break (MPa) | 23 | 23 | 22 | 26 | 23 | 18 | 19 | 25 | 25 | 25 | 26 |
| Strain at break (%) | 290 | 240 | 250 | 230 | 240 | 370 | 260 | 300 | 280 | 300 | 300 |
| Shrinkage (%) | 1.7 | 0.5 | 0.5 | 0.7 | 0.5 | 1.1 | 1.6 | 0.6 | 0.6 | 0.7 | 0.7 |

Comparative Example 1 shows the relevant properties for a sample comprised of 100% Hytrel® G5544 copolyether ester.

Example 2a, when compared to Comparative Example 1, shows how the addition of amorphous polycarbonate and the core-shell impact modifier serves to increase both stiffness (E Modulus) and hardness, decrease both tear strength and shrinkage, all without causing a significant change in tensile strength. Example 2b, when compared to Example 2a, demonstrates that decreasing, but not eliminating, the core shell impact modifier increases both the stiffness and hardness of the composition, with only a small increase in the tear strength. In Example 2c, when compared to Example 2b, shows that elimination of the clay reduces the stiffness and hardness of the composition, but increases the tear strength. The composition of Example 2c, when extruded as a buffer tube, has a smoother surface than the compositions of Examples 2a and 2b.

Examples 3a and 3b demonstrate that using a rubber in place of the core shell impact modifier results in a composition with similar tear resistance and hardness, reduced stiffness and stress at break, and increased shrinkage and strain at break.

Examples 4a and 4b demonstrate show how the addition of amorphous polycarbonate serves to reduce the shrinkage of the composition.

Examples 5a, 5b and 5c demonstrate how similar results can be obtained using a range of particulate fillers (clay, Wollastonite and Silitin).

I claim:

1. A covered optical fiber comprising:
    at least one optical fiber; and
    a buffer tube covering surrounding the optical fiber, said covering being comprised of a blend of at least 40% by weight of a copolyether ester elastomer, at least 10% by weight of a rubbery modifier, and at least 10% by weight of an amorphous thermoplastic polymer, said blend having a melting point of at least 165° C. and a Trouser Tear Strength of less than 65 N/mm.

2. The covered optical fiber of claim 1 wherein the blend comprising the buffer tube covering has a Shore D hardness of at least 55 and an E Modulus of at least 200 MPa.

3. The covered optical fiber of claim 1 wherein the blend of said covering is comprised of 40% to 80% by weight of a copolyether ester elastomer, 10% to 40% by weight of a rubbery modifier, and 10% to 40% by weight of an amorphous thermoplastic polymer.

4. The covered optical fiber of claim 3 wherein the rubbery modifier is a polymer selected from the group core-shell impact modifier or a rubber.

5. The covered optical fiber of claim 3 wherein the amorphous thermoplastic polymer is a thermoplastic polymer selected from the group of polycarbonates, amorphous PET, amorphous PBT, PMMA, SAN, ABS, and blends thereof.

6. The covered optical fiber of claim 5 wherein the amorphous thermoplastic polymer is a polycarbonate.

7. The covered optical fiber of claim 6 wherein the blend comprising the buffer tube covering has a shrinkage of less than 1 percent.

8. The covered optical fiber of claim 7 wherein the rubbery modifier is a core-shell impact modifier having a rubbery butyl-acrylate core onto which a glassy thermoplastic methyl methacrylate shell is grafted wherein the core makes up 70 to 90 percent by weight of the modifier.

9. The covered optical fiber of claim 7 wherein the rubbery modifier is a vulcanized acrylate terpolymer.

10. A covered optical fiber comprising:
    at least one optical fiber; and
    a buffer tube covering surrounding the optical fiber, said covering being comprised of a blend of 40% to 80% by weight of a copolyether ester elastomer, 10% to 40% by weight of a core-shell impact modifier, 10% to 40% by weight of a polycarbonate polymer, said blend having a melting point of at least 165° C., a Trouser Tear Strength of less than 65 N/mm, a Shore D hardness of at least 55 and an E Modulus of at least 200 MPa.

11. The covered optical fiber of claim 10 wherein the blend comprising the buffer tube covering has a Trouser Tear Strength of less than 55 N/mm, a Shore D hardness of at least 60, an E Modulus of at least 300 MPa, and a shrinkage of less than 1%.

* * * * *